May 3, 1966   D. E. GUNLOCK   3,248,745
SPRING SEAT CONSTRUCTION
Filed Oct. 26, 1964   2 Sheets-Sheet 1
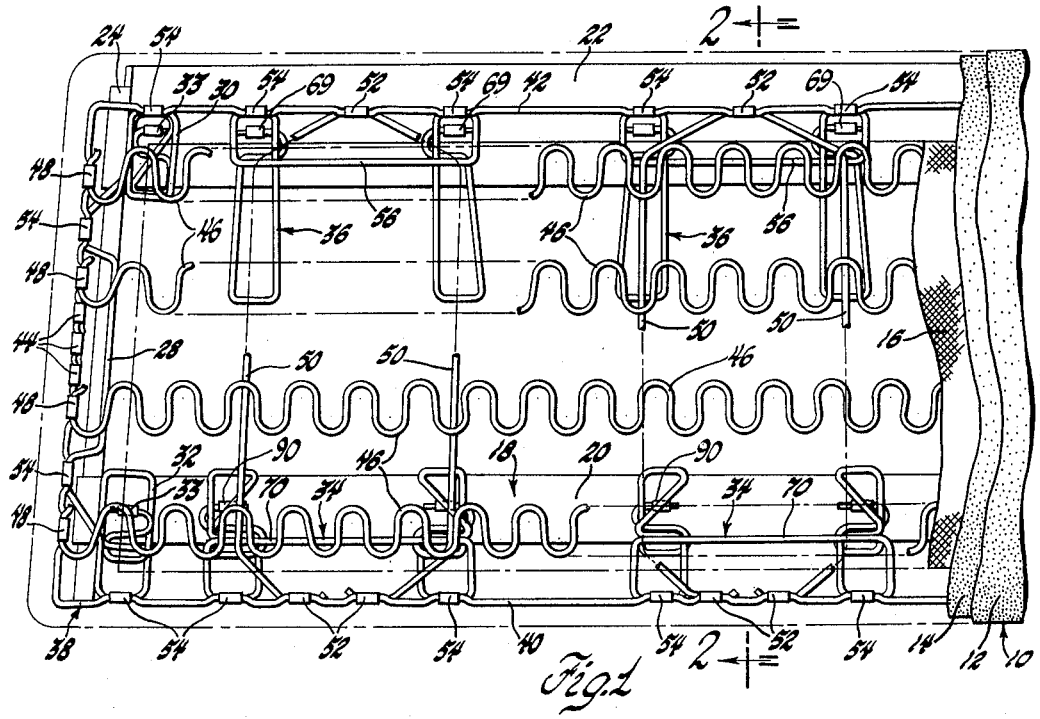
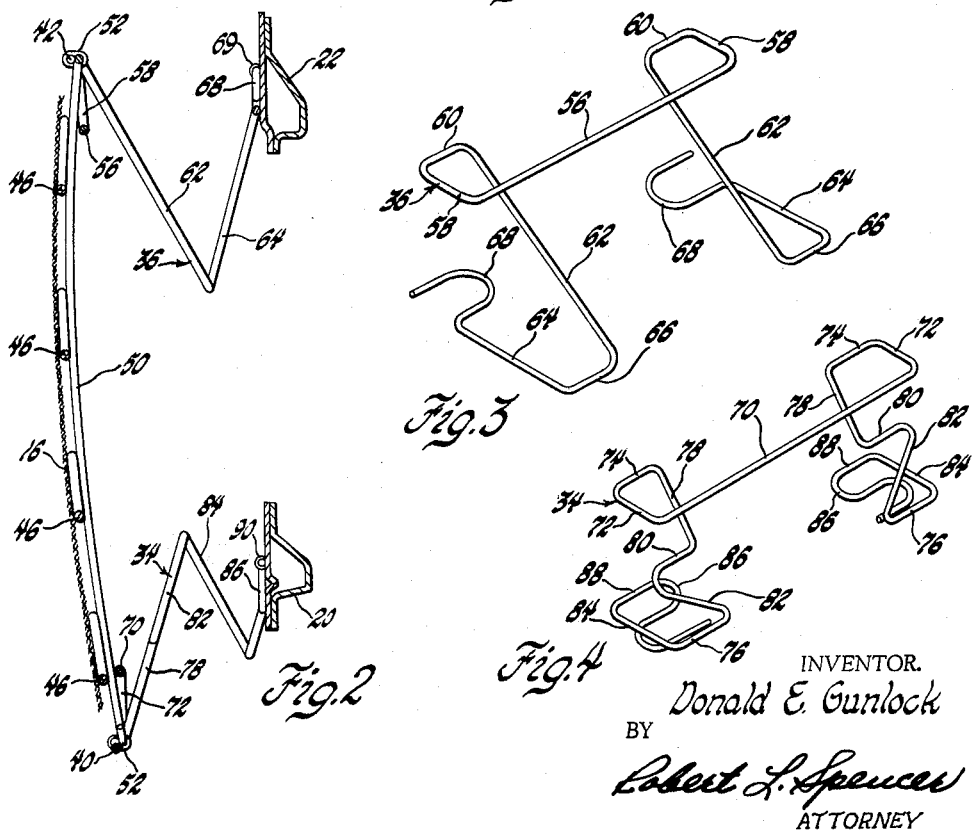
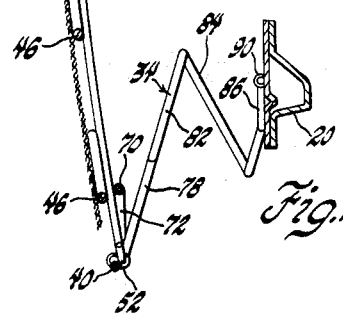
INVENTOR.
Donald E. Gunlock
BY
Robert L. Spencer
ATTORNEY May 3, 1966 D. E. GUNLOCK 3,248,745
SPRING SEAT CONSTRUCTION
Filed Oct. 26, 1964 2 Sheets-Sheet 2
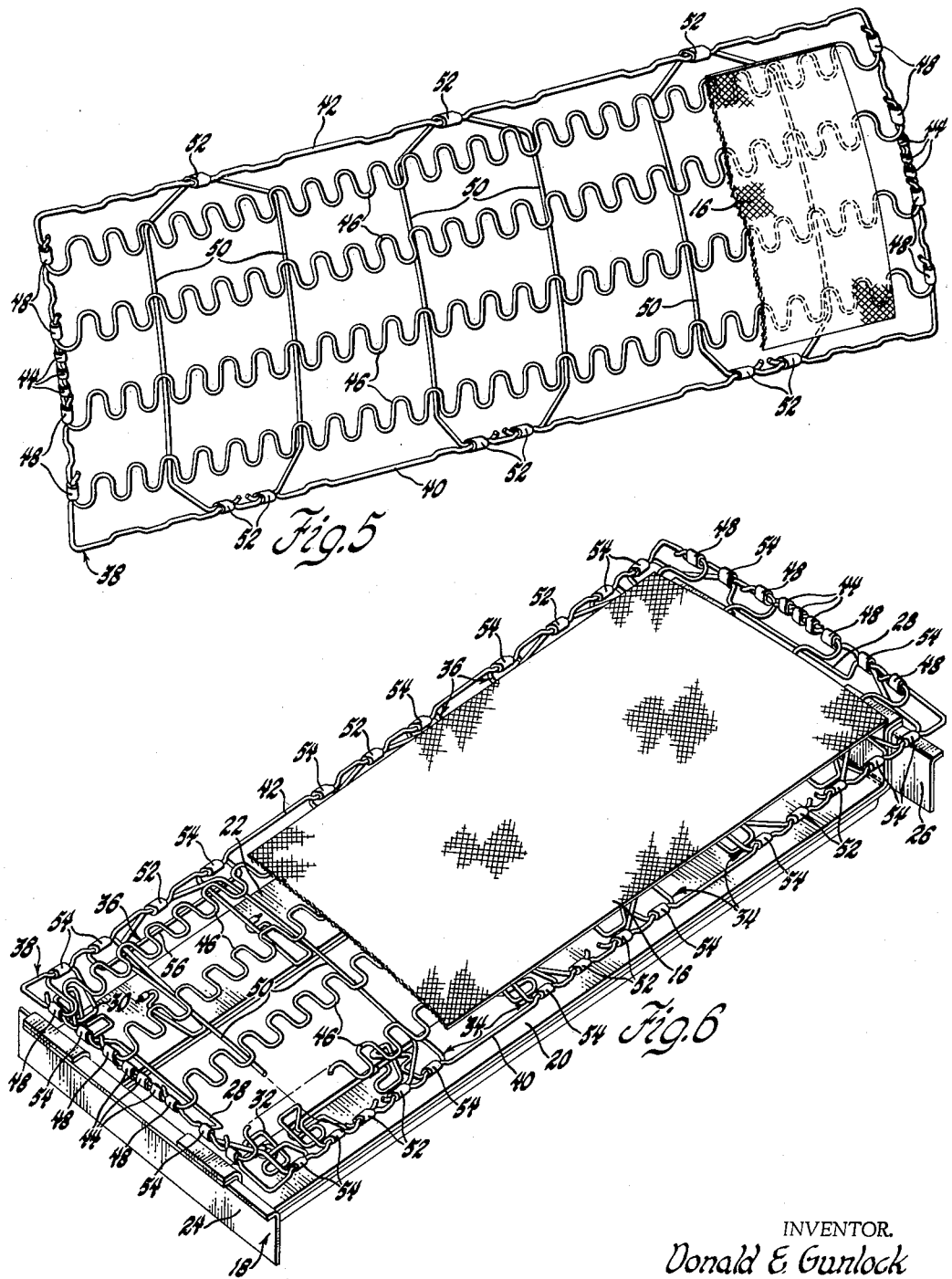
INVENTOR.
Donald E. Gunlock
BY
Robert L. Spencer
ATTORNEY United States Patent Office 3,248,745
Patented May 3, 1966

3,248,745
SPRING SEAT CONSTRUCTION
Donald E. Gunlock, Birmingham, Mich., assignor to General Motors Corporation, Detroit, Mich., a corporation of Delaware
Filed Oct. 26, 1964, Ser. No. 406,299
7 Claims. (Cl. 5—354)

This invention relates to spring seats and more particularly to the supporting spring structure. This particular invention deals with the individual springs that are used to form subassemblies, the subassemblies themselves and the complete spring assembly consisting of the various subassemblies.

The most prevalent method of manufacturing spring seats now used in industry is substantially a hand operation. When seat cushions are made by this method, the individual spring elements are assembled one at a time on the seat frame in a "building-up" process which is epensive and does not lend itself to automation.

The general practice in industry is to manufacture the components of the seat spring assembly at different locations, collect these components at a central location where the seat spring assembly is manufactured and the padding and cover added to complete the seat cushion. Such practices require extensive inventory control to assure the proper amount of the various components for each individual spring seat manufactured.

It is an object of this invention to provide a spring assembly consisting of two subassemblies which are designed to be assembled and easily transported as a subassembly to reduce the inventory control necessitated by the present method of manufacturing.

A further object invention is to provide a subassembly which readily lends itself to automation for low manufacturing costs.

Another object of this invention is to provide a novel seat spring support assembly that lends itself to having components assembled by automatic equipment into subassemblies that may be readily assembled to each other by a few simple hand operations, thus eliminating excessive hand operations now required in conventional seat structures.

A further object of this invention is to provide a basic spring seat design in which the resilience of the completed seat assembly may be varied as desired by using simple variations of basic spring elements.

A further object of this invention is to provide a basic spring element as a supporting spring for the spring seat assembly in which one dimension of the spring may be varied to provide varying support on the surface of the seat and allow an infinite variation of resiliency of completed seats.

Another object of this invention is to provide a support spring for the support spring assembly which has two supporting legs adapted to support a cross bar at varying distances from the edge of the seat wherein the cross bar supports the load bearing surface of the seat.

These and other objects of this invention may be readily seen by reference to the accompanying specification and drawings wherein:

FIGURE 1 is a view of a spring assembly, with sections broken away, utilizing the present invention.

FIGURE 2 is a view substantially along the line 2—2 of FIGURE 1 illustrating the supporting springs and assembled relation of the load bearing platform.

FIGURE 3 is a perspective view of the rear supporting spring.

FIGURE 4 is a perspective view of the front supporting spring.

FIGURE 5 is a view of the load bearing spring subassembly, with portions broken away, showing the relation of the longitudinal springs to the transverse supporting springs.

FIGURE 6 is a view of the completed spring assembly combining the load bearing spring subassembly and the supporting springs.

Referring now to the drawings, as best seen in FIGURES 1 and 6, a seat cushion 10 consisting of an outer surface covering 12, padding 14 and insulator 16 and the resilient spring structure are mounted on the seat frame 18. Seat frame 18 is a generally rectangular structure consisting of a front rail 20 and a rear rail 22 interconnected at each end by end rails 24, 26.

In this particular seat, the spring seat assembly is designed to be assembled in two main subassemblies. The subassemblies consist of the base or supporting subassembly which includes the frame and supporting springs and the load bearing subassembly which includes a border wire having transverse wires and longitudinally extending zig-zag wires and the insulator.

In the supporting subassembly, an end support spring 28 extends transversely of the seat frame 18 adjacent each end rail 24 and 26. Each end supporting spring 28 has a V shaped supporting portion 30 which is secured to the rear rail 22 and a W shaped supporting portion 32 which is secured to the front rail 20. The end supporting springs 28 have their supporting portions 30 and 32 secured to the seat frame 18 by conventional means such as clips 33. A plurality of front supporting springs 34, as best seen in FIGURE 4, are longitudinally spaced along the front rail 20, as can be seen in FIGURES 1 and 6. A plurality of rear supporting springs 36 are longitudinally spaced along the rear rail 22 in the same manner as the front supporting spring 34, in such a manner that each front support spring is paired with or longitudinally coextensive with a rear support spring. Thus, with reference to the drawings, it can be seen that the supporting subassembly consists of the frame 18 with the end support springs 28 and front and rear support springs 34 and 36, respectively. The spring supporting subassembly presents a substantially level support area consisting of a plurality of wire segments of the various support springs being in the same plane for supporting portions of the load bearing subassembly and being secured to portions of the load bearing subassembly as will be further explained.

The load bearing subassembly, as best seen in FIGURE 5, has a rectangular border wire 38 which consists of two generally U shaped wires 40, in the front, and 42, in the rear. The generally rectangular border wire 38 is formed by joining the ends of the U shaped wires 40 and 42 by conventional means such as sheet metal clips 44. A plurality of zig-zag spring elements 46 extend longitudinally of the border wire 38 and the ends thereof are clamped to the border wire by conventional means such as sheet metal clips 48. The load bearing zig-zag wires 46 are bonded to the mounting fabric or insulator 16. The mounting fabric, preferably of burlap, and the zig-zag springs 46 together form a mat subassembly which assures proper spacing of the load bearing zig-zag springs and facilitates the handling of these springs. A plurality of generally rectangular transverse wires 50 are longitudinally spaced within the border wire and clipped to the border wire by conventional sheet metal clips 52. The transverse wires are positioned beneath the zig-zag springs 46 but are not secured to the zig-zag springs thus allowing movement of the springs relative thereto and preventing hard spots on the seat. This load bearing subassembly consisting of the border wire 38, longitudinal zig-zag springs 46, burlap insulator 16, and transverse wires 50 is assembled as a separate unit for installation on the supporting spring subassembly previously described.

To complete the seat spring assembly, the load bearing subassembly is placed on the supporting spring subassembly in such a manner that the transverse wires 50 contact front supporting spring 34 and a rear supporting spring 36. Then the border wire 38 is secured to the supporting springs by conventional means such as sheet metal clips 54 to complete the seat spring support assembly.

The rear cantilever support spring 36 and the front cantilever support spring 34, as seen in FIGURES 3 and 4, respectively, are examples of the novel type of supporting springs used in this seat structure. Referring now to FIGURE 3, the rear cantilever support spring 36 is made of one piece of wire and has a deck or load supporting cross wire 56 for contacting the transverse wires 50 of the load bearing subassembly and thus providing support for any load applied to the central area of the seat. Each end of the cross wire 56 is supported by a leg portion having one end of an arm 58 connected to the cross wire 56 and to a torsion bar 60 at the other. The main portion of the leg is a generally V shaped supporting member having divergent arm portions 62 and 64 connected by a torsion bar 66. The arm 64 is connected to a generally U shaped foot portion 68 which is clipped to the rear rail 22 by a clip 69, as best seen in FIGURE 2. The torsion bars 60 are positioned for being clipped to the border wire 38 of the load bearing subassembly in the final fabrication step.

Referring now to FIGURE 4, the front cantilever support spring 34 has a deck portion or load supporting cross wire 70 for contacting the transverse wires 50 of the load subassembly in the same manner as the rear support spring 36 for providing support of any load applied to the central area of the seat. Each end of the cross wire 70 is supported by a leg portion that has a slightly different design from that of the rear support spring 36. The variations of leg portions are well known in the art to provide support for the various types of loads imposed on the edges of seat cushions. Each end of the cross wire 70 is supported by a leg portion having one end of an arm 72 connected to the cross wire 70 and to a torsion bar 74 at the other end. The main portion of the leg is a generally V shaped supporting member having divergent arm portions connected by a torsion bar 76. The upper arm portion has a straight wire 78 connected between torsion bar 74 and an intermediate torsion bar 80. The torsion bars 80 and 76 are connected by a diagonal wire section 82. The lower arm portion 84 is a straight wire section that interconnects the torsion bar 76 and a foot portion 86 of the leg. The foot portion 86 is an S shaped member with one arm 88 of the S acting as a torsion bar. The foot portion 86 is clipped to the front rail 20 by a clip 90, as best seen in FIGURE 2. The torsion bars 74 are positioned for being clipped to the border wire 38 of the load bearing subassembly in the final fabrication step.

The leg portions shown and described for these springs 34 and 36 can be altered in many ways, as known in the art, and still provide support for the seat edges and the load supporting cross wires 56 and 70.

The lengths of the arms 58 and 72 which support the cross wires 56 and 70, respectively, may be varied in length to position the cross wires 56 and 70 at desired distances from the edge of the seat cushions. Thus, the resilience of the seat cushion surface may be varied by the support provided by the cross wires as transferred to the surface of the seat cushion by the transverse wires 50 and the zig-zag springs 46. By increasing the length of the arms 58 or 72, the cross wires 56 or 70, respectively, contact the transverse wires 50 further from the border wire and tend to soften the seat cushion edge and to stiffen the central area of the seat cushion.

While but one embodiment of the subject device has been shown and described herein, it is obvious that many structural changes may be made without departing from the spirit and scope of the following claims.

I claim:

1. A seat spring assembly for an upholstered seat having a support subassembly and a load bearing subassembly, said support subassembly including a rectangular frame having an elongated front rail, an elongated rear rail and two end rail joining the ends of said front and rear rails, a pair of end support springs, one end support spring mounted adjacent each end rail and having one end secured to said front rail and the other end secured to said rear rail, a plurality of cantilever front support springs secured to said front rail, a plurality of cantilever rear support springs secured to said rear rail, each of said support springs presenting a support portion spaced from said frame in substantially the same plane for supporting said load bearing subassembly, said load bearing subassembly including a rectangular border wire, a plurality of zig-zag wire strips extending longitudinally of said border wire and having their ends secured to the opposite sides of said border wire, a mounting fabric insulator bonded to said zig-zag strips, a plurality of generally rectangular transverse wires extending transversely of said border wire and secured to the opposite sides thereof, said transverse wires being positioned at substantially right angles to said zig-zag wires and in contact with said zig-zag wires and said support springs and positioned therebetween, and means for securing said border wire to said support springs for joining said subassemblies to complete the seat spring assembly.

2. A seat spring assembly as claimed in claim 1 wherein each of said cantilever support springs is formed from a single piece of wire and includes an elongated deck portion for contacting one of said rectangular transverse wires, a pair of resilient supporting legs, one of said supporting legs supporting each end of said deck portion, a foot portion on each leg secured to one of said rails and a torsion bar section of each leg positioned in substantially the same plane as said deck portion for being clamped to and for supporting said border wire of said load bearing subassembly.

3. In a spring seat assembly having a frame, a plurality of support springs mounted in pairs on opposed sides of said frame, and a load bearing subassembly, each of said support springs being formed from a continuous wire segment and including a foot at each end secured adjacent to each other on the same side of said frame, an elongated load supporting member extends substantially parallel to the side of said frame upon which it is secured, a resilient leg portion extending above each foot portion for supporting each end of said load supporting member and each of said leg portions having a bar section in the same plane as said load supporting member for being connected to said load bearing subassembly.

4. A support spring as claimed in claim 3 wherein each resilient leg portion includes a V shaped supporting portion having a torsion bar at the apex thereof and a pair of divergent arms, one of said arms extending from each end of said apex torsion bar and said apex torsion bars being substantially parallel to said load supporting member.

5. In a spring seat assembly having a frame, a plurality of support springs mounted on said frame and a load bearing subassembly, each of said support springs having feet portions adapted to be secured to said frame, a support area comprising a pair of parallel lever segments having one end of each interconnected by a straight cross wire segment and the other end of each connected to their respective torsion bar segments which are substantially parallel to said cross wire segment, all of said segments being in the same plane for supporting said load bearing subassembly, a V shaped integrally formed wire member interconnecting each of said torsion bar segments with a foot portion for yieldably supporting said support area relative to said frame and means for securing said support spring to said frame and said load bearing subassembly.

6. A seat spring support assembly consisting of a supporting spring subassembly and a load bearing subassembly, said supporting spring subassembly including a frame, a plurality of cantilever wire support springs and a pair of end support springs secured to said frame, one of said end support springs secured to and extending transversely of said frame adjacent each end of said frame, each of said cantilever support springs having two support legs secured adjacent each other on the same side of said frame for supporting a load supporting portion spaced from said frame, a support plane formed by said load supporting portion of said support springs for receiving said load bearing subassembly, said load bearing subassembly including a mounting fabric, a rectangular border wire, a plurality of formed wire strips bonded to said fabric, said wire strips extending longitudinally of said border wire, each end of each of said wire strips being secured to the adjacent end of said border wire, and a plurality of transverse support wires extending transversely of said border wire and being secured thereto for supporting said fabric and said formed wire strips upon said support plane, and means for securing said border wire to said support springs for securing said load bearing subassembly on said support plane of said supporting spring subassembly.

7. A seat spring assembly for an upholstered seat having a support subassembly and a load bearing subassembly, said support subassembly including a rectangular frame having an elongated front rail, an elongated rear rail and two end rails joining the respective ends of said front and rear rails, a pair of end support springs, one end support spring mounted adjacent each end rail and having one end secured to said front rail and the other end secured to said rear rail, a plurality of cantilever front support springs secured to said front rail, a plurality of cantilever rear support springs secured to said rear rail, each of said cantilever support springs being formed from a single wire section and having an elongated load supporting cross wire extending substantially parallel to the respective frame rail upon which it is mounted, an arm section at each end of said load supporting cross wire extending at right angles thereto and each arm section being connected to a torsion bar substantially parallel to said load supporting cross wire, a depending support leg connecting each of said torsion bars to a foot portion secured to the associated frame rail, said load supporting cross wire and said arm sections and said torsion bars presenting a support portion spaced from said frame, said support portions of said cantilever support springs being in substantially the same plane for supporting said load bearing subassembly, said load bearing subassembly including a rectangular border wire, a plurality of zig-zag wire strips extending longitudinally of said border wire and having their ends secured to the adjacent sides of said border wire, a mounting fabric insulator bonded to said zig-zag strips, a plurality of generally rectangular transverse wires extending transversely of said border wire and secured to the opposite sides thereof, said transverse wires being positioned at substantially right angles to said zig-zag wires and in contact with said zig-zag wires and said support springs and positioned therebetween, and means for securing said border wire to said torsion bars of said support springs and to said end support springs for joining said subassemblies to complete said seat spring assembly.

References Cited by the Examiner
UNITED STATES PATENTS

| | | | |
|---|---|---|---|
| 2,459,756 | 1/1949 | Flint | 5—247 |
| 2,591,185 | 4/1952 | Neely | 267—85 |
| 2,789,629 | 4/1957 | Dewees | 5—354 |
| 2,790,488 | 4/1957 | Flint | 267—104 |
| 2,856,987 | 10/1958 | Lelli | 267—104 |
| 3,005,213 | 10/1961 | Brown et al. | 5—354 |
| 3,070,814 | 1/1963 | Withoff | 5—354 |

FRANK B. SHERRY, *Primary Examiner.*

C. A. NUNBERG, *Assistant Examiner.*